(12) United States Patent
Kobayashi

(10) Patent No.: US 8,740,469 B2
(45) Date of Patent: Jun. 3, 2014

(54) ROLLER BEARING

(75) Inventor: Yasuhiro Kobayashi, Osaka (JP)

(73) Assignee: JTEKT Corporation, Osaka-Shi (JP)

( * ) Notice: Subject to any disclaimer, the term of this patent is extended or adjusted under 35 U.S.C. 154(b) by 0 days.

(21) Appl. No.: 13/112,235

(22) Filed: May 20, 2011

(65) Prior Publication Data

US 2011/0293211 A1   Dec. 1, 2011

(30) Foreign Application Priority Data

May 27, 2010  (JP) ................................. 2010-121465

(51) Int. Cl.
*F16C 33/372* (2006.01)

(52) U.S. Cl.
USPC ........................................................ 384/551

(58) Field of Classification Search
USPC .................. 384/551, 520, 523, 572
See application file for complete search history.

(56) References Cited

U.S. PATENT DOCUMENTS

| | | | | |
|---|---|---|---|---|
| 1,001,673 A * | 8/1911 | Newmann | ...................... | 384/552 |
| 3,606,504 A * | 9/1971 | Wojciechowski | ............. | 384/551 |
| 5,597,243 A | 1/1997 | Kaiser et al. | | |
| 7,101,088 B2 * | 9/2006 | Yamamoto et al. | ........... | 384/470 |
| 2009/0252448 A1* | 10/2009 | Ozu et al. | ...................... | 384/551 |
| 2010/0278470 A1* | 11/2010 | Grull et al. | .................... | 384/572 |

FOREIGN PATENT DOCUMENTS

| | | | |
|---|---|---|---|
| DE | 499 378 | 6/1930 | |
| DE | 523 480 | 4/1931 | |
| DE | 196 05 743 A1 | 8/1997 | |
| EP | 1921333 A1 * | 5/2008 | .................... 384/551 |
| JP | A-06-058334 | 3/1994 | |
| JP | A-2007-64434 | 3/2007 | |
| JP | A-2007-271021 | 10/2007 | |
| WO | WO 93/04293 | 3/1993 | |

OTHER PUBLICATIONS

Apr. 5, 2013 Extended Search Report issued in European Patent Application No. 11 16 7224.
Jan. 7, 2014 Office Action issued in Japanese Patent Application No. 2010-121465 (with translation).

* cited by examiner

*Primary Examiner* — James Pilkington
*Assistant Examiner* — Richard Urbanski
(74) *Attorney, Agent, or Firm* — Oliff PLC

(57) ABSTRACT

Each separator is interposed between two cylindrical rollers next to each other in the circumferential direction of a cylindrical roller bearing. A first concave surface on which the cylindrical roller slides and a first groove are formed in a first end surface that is one end surface of the separator in the circumferential direction. The first groove opens at one end of the separator in the axial direction of the roller bearing, and opens at one end of the separator in the radial direction of the roller bearing. When the separator is fitted to the roller bearing, the first groove opens toward a first rib of the inner ring in the axial direction, and opens toward the outer peripheral cylindrical raceway surface in the radial direction.

4 Claims, 4 Drawing Sheets

ROLLER BEARING

INCORPORATION BY REFERENCE

The disclosure of Japanese Patent Application No. 2010-121465 filed on May 27, 2010 including the specification, drawings and abstract is incorporated herein by reference in its entirety.

BACKGROUND OF THE INVENTION

1. Field of the Invention

The invention relates to a roller bearing, for example, a cylindrical roller bearing, a tapered roller bearing or a convex roller bearing (spherical roller bearing). The invention relates to a roller bearing that is suitably used for rotatably supporting, for example, a rotating shaft in a gearbox for wind-power generation.

2. Description of Related Art

Japanese Patent Application Publication No. 2007-64434 (JP 2007-64434 A) describes a tapered roller bearing that is an example of a conventional roller bearing.

The tapered roller bearing includes an outer ring, an inner ring, a plurality of tapered rollers and a plurality of separators. The tapered rollers and the separators are arranged between the outer ring and the inner ring. The inner ring has a rib that is positioned next to a tapered raceway surface of the inner ring and at a large diameter-side end of the inner ring. The rib has a roller guide surface, and the roller guide surface guides a large diameter-side end surface of the tapered roller. In addition, a lubricant is supplied between the inner ring and the outer ring.

Each separator is arranged between the two tapered rollers that are next to each other in the circumferential direction of the tapered roller bearing. Each separator has a concave surface on which the tapered roller slides, and a groove. The groove extends in the axial direction, the radial direction or the circumferential direction of the tapered roller bearing.

In the tapered roller bearing described above, the separators are used instead of a cage conventionally used. Thus, the above-described tapered roller bearing includes a larger number of tapered rollers and therefore has a higher bearing load-carrying capacity. The lubricant stored in the groove is supplied to sliding portions such as a rolling contact surface of the tapered roller. Thus, for example, when the tapered roller bearing rotates at high speed under no-load conditions, it is possible to suppress smearing and seizure that may occur if the tapered rollers slip.

However, the conventional tapered roller bearing described above has a problem that the effect of suppressing smearing and seizure of the sliding portions is not sufficient. Especially, there is a problem that the effect of suppressing seizure of the roller guide surface is not produced.

SUMMARY OF THE INVENTION

It is an object of the invention to provide a roller bearing which has an excellent bearing load-carrying capacity and in which seizure of a roller guide surface of a raceway member is suppressed.

A roller bearing according to an aspect of the invention includes: a first raceway member that has a raceway surface and a first rib that is positioned at one side of the raceway surface in an axial direction of the roller bearing; a second raceway member that has a raceway surface; a plurality of rollers arranged between the raceway surface of the first raceway member and the raceway surface of the second raceway member; and a plurality of separators which are arranged between the raceway surface of the first raceway member and the raceway surface of the second raceway member and each of which is interposed between two of the rollers next to each other in a circumferential direction of the first raceway member. A first end surface of the separator that is one end surface of the separator in the circumferential direction has a first concave surface on which the roller slides and a first groove that is contiguous with the first concave surface. The first groove opens toward the first rib in the axial direction and opens toward the raceway surface of the first raceway member in a radial direction of the roller bearing.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereafter, an embodiment of the invention will be described in detail with reference to the accompanying drawings.

Figure 1:
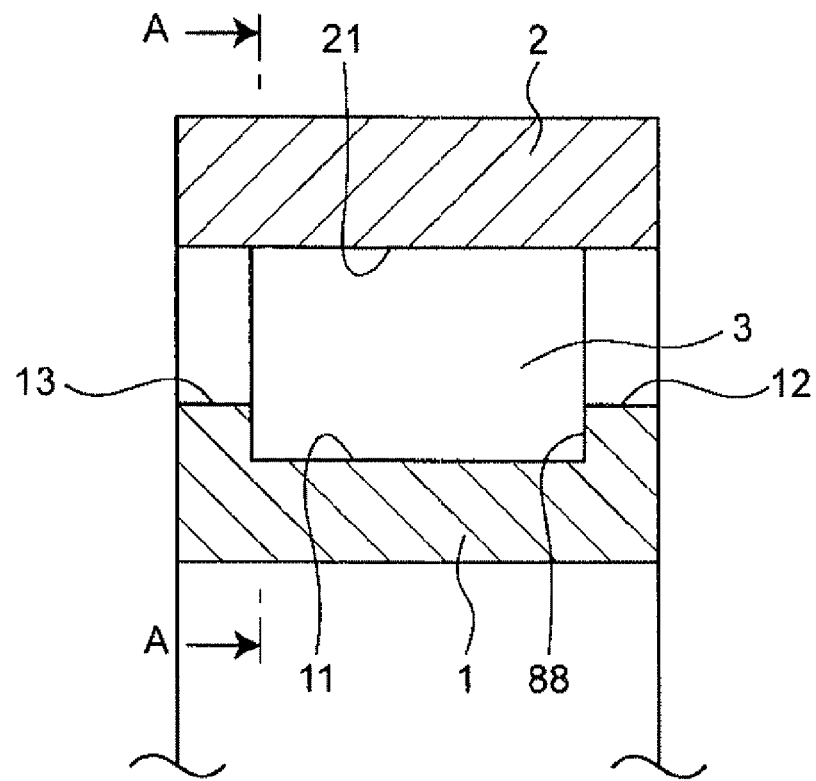
FIG. 1 is a schematic cross-sectional view of a cylindrical roller bearing along its axial direction, according to an embodiment of the invention.

FIG. 1 is a schematic cross-sectional view of a cylindrical roller bearing along its axial direction, according to an embodiment of the invention.

The cylindrical roller bearing includes an inner ring 1 that serves as a first raceway member, an outer ring 2 that serves as a second raceway member, a plurality of cylindrical rollers 3, and a plurality of separators 7 (separators) (not shown in FIG. 1).

The inner ring 1 has an outer peripheral cylindrical raceway surface 11 that serves as a raceway surface, a first rib 12, and a second rib 13. The first rib 12 is positioned at one side of the outer peripheral cylindrical raceway surface 11 in the axial direction. The second rib 13 is positioned at the other side of the outer peripheral cylindrical raceway surface 11 in the axial direction.

The outer ring 2 has an inner peripheral cylindrical raceway surface 21 that serves as a raceway surface. The number of the cylindrical rollers 3 is equal to the number of the separators 7. The cylindrical rollers 3 and the separators 7 are arranged alternately in the circumferential direction of the inner ring 1. The cylindrical rollers 3 are arranged between the outer peripheral cylindrical raceway surface 11 of the inner ring 1 and the inner peripheral cylindrical raceway surface 21 of the outer ring 2. The cylindrical rollers 3 are separated from each other in the circumferential direction by the separators 7.

Figure 2:
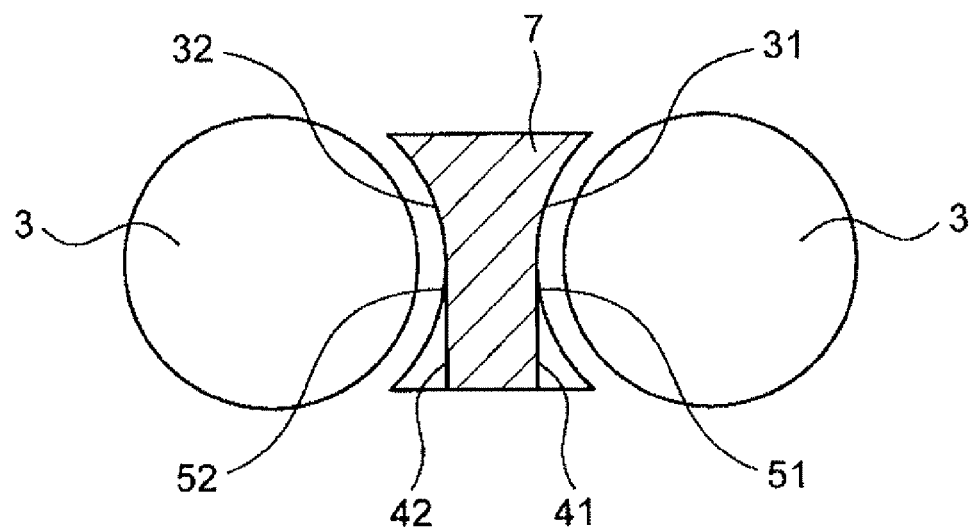
FIG. 2 is a schematic cross-sectional view of a part of the cylindrical roller bearing along its circumferential direction.

FIG. 2 is a cross-sectional view taken along the line A-A in FIG. 1 (cross-sectional view along the circumferential direction of the cylindrical roller bearing). In FIG. 2, the inner ring 1 and the outer ring 2 are omitted.

As shown in FIG. 2, each separator 7 has a first end surface 51 and a second end surface 52. The first end surface 51 is one end surface of the separator 7 in the circumferential direction (the circumferential direction of the cylindrical roller bearing, which coincides with the circumferential direction of the inner ring 1). The second end surface 52 is the other end surface of the separator 7 in the circumferential direction.

The first end surface 51 has a first concave surface 31 and a first groove (slit) 41. The first concave surface 31 forms a major portion of the first end surface 51. The first groove 41 is formed by recessing the first concave surface 31, is contiguous with the first concave surface 31, is positioned at one end of the first concave surface 31 in the axial direction of the cylindrical roller bearing, and extends in the radial direction of the cylindrical roller bearing. When each separator 7 is fitted to the cylindrical roller bearing, the first groove 41 opens toward the first rib 12 (see FIG. 1) in the axial direction, and opens toward the outer peripheral cylindrical raceway surface 11 (see FIG. 1) in the radial direction.

The second end surface 52 has a second concave surface 32 and a third groove (slit) 42. The second concave surface 32 forms a major portion of the second end surface 52. The third groove 42 is formed by recessing the second concave surface 32, is contiguous with the second concave surface 32, is positioned at one end of the second concave surface 32 in the axial direction of the cylindrical roller bearing, and extends in the radial direction of the cylindrical roller bearing. When each separator 7 is fitted to the cylindrical roller bearing, the third groove 42 opens toward the first rib 12 in the axial direction, and opens toward the outer peripheral cylindrical raceway surface 11 in the radial direction.

Figure 3:
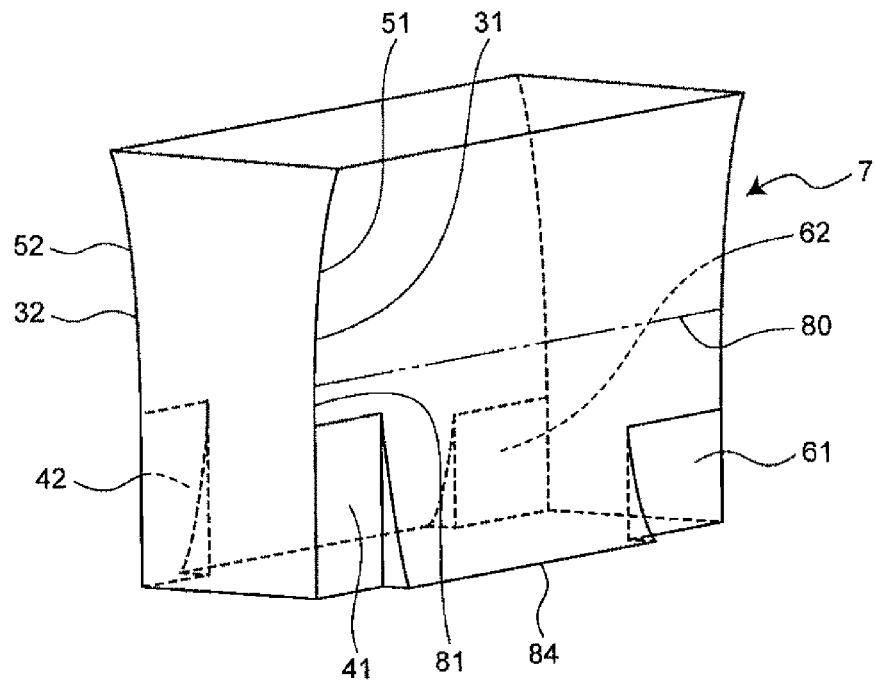
FIG. 3 is a perspective view of a separator of the cylindrical roller bearing.

FIG. 3 is a perspective view of the separator 7.

As shown in FIG. 3, the first end surface 51 of the separator 7 has a fourth groove 61 in addition to the first concave surface 31 and the first groove 41. The fourth groove 61 extends in the radial direction of the cylindrical roller bearing. When each separator 7 is fitted to the cylindrical roller bearing, the fourth groove 61 opens toward the second rib 13 in the axial direction, and opens toward the outer peripheral cylindrical raceway surface 11 in the radial direction. The width of the first groove 41 in the axial direction differs from the width of the fourth groove 61 in the axial direction. The length of the first groove 41 in the radial direction differs from the length of the fourth groove 61 in the radial direction.

The first groove 41 and the fourth grove 61 are present only in a region 81 that is on one side with respect to a position 80 in the radial direction of the cylindrical roller bearing. When the cylindrical roller bearing is used, the region 81 is on the inner side with respect to the position 80 in the radial direction of the cylindrical roller bearing. When each separator 7 is fitted to the cylindrical roller bearing, the cylindrical roller 3 contacts the first concave surface 31 at the position 80. Further, the first concave surface 31 is deepest at the position 80 in its depth direction. Note that the two-dot chain line indicating the position 80 is illustrated for convenience sake, and, as a matter of course, no visible line is formed in a product.

The second end surface 52 of the separator 7 has a fifth groove 62 in addition to the second concave surface 32 and the third groove 42. The fifth groove 62 extends in the radial direction of the cylindrical roller bearing. When each separator 7 is fitted to the cylindrical roller bearing, the fifth groove 62 opens toward the second rib 13 in the axial direction, and opens toward the outer peripheral cylindrical raceway surface 11 in the radial direction. The width of the third groove 42 in the axial direction differs from the width of the fifth groove 62 in the axial direction. The length of the third groove 42 in the radial direction differs from the length of the fifth groove 62 in the radial direction. The grooves 41, 42, 61 and 62 formed in the above-described manner have different characteristics. Thus, the effect of supplying the lubricant from the grooves to sliding portions is less likely to be influenced by the operating state of the roller bearing.

The third groove 42 and the fifth grove 62 are present only in a region that is on one side with respect to a given position in the radial direction of the cylindrical roller bearing. When the cylindrical roller bearing is used, the region is on the inner side with respect to the given position in the radial direction of the cylindrical roller bearing. When each separator 7 is fitted to the cylindrical roller bearing, the cylindrical roller 3 contacts the second concave surface 32 at the given position. Further, the second concave surface 32 is deepest at the given position in its depth direction.

Figure 4:
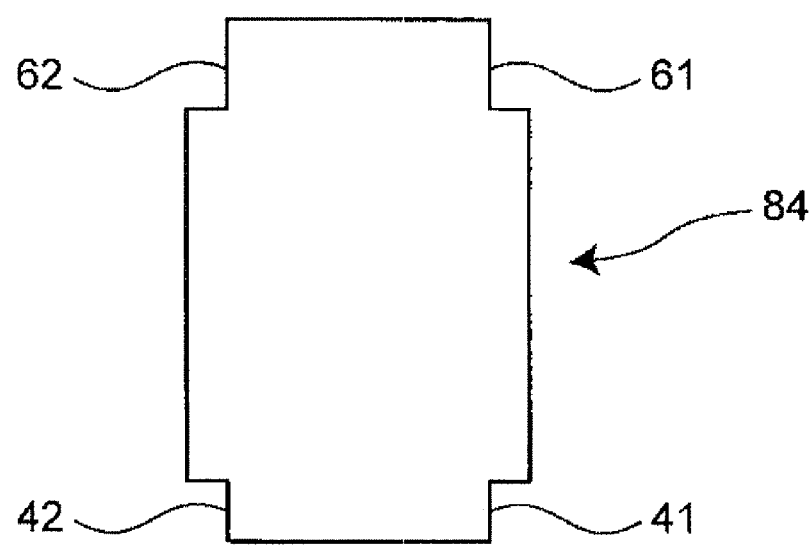
FIG. 4 is a plain view of one end surface of the separator in the radial direction of the cylindrical roller bearing (inner surface of the separator in the radial direction of the cylindrical roller bearing, when the separator is fitted to the cylindrical roller bearing)

FIG. 4 is a plain view of one end surface (bottom surface) 84 of the separator 7 in the radial direction of the cylindrical roller bearing.

When each separator 7 is fitted to the cylindrical roller bearing, the end surface 84 is an inner end surface of the separator 7 in the radial direction of the cylindrical roller bearing. As shown in FIG. 4, in a plain view, the end surface 84 has a shape obtained by cutting rectangular portions from four corners of a rectangle. In the plain view, the end surface 84 has such a shape that there is a straight line that is substantially parallel to the axial direction of the cylindrical roller bearing and that substantially vertically divides the plain view of the end surface 84 shown in FIG. 4 into two equal parts. As shown in FIG. 4, the width of the first groove 41 in the axial direction (the axial direction of the cylindrical roller bearing) is smaller than the width of the fourth groove 61 in the axial direction. The width of the third groove 42 in the axial direction is smaller than the width of the fifth groove 62 in the axial direction. The end surface 84 may be a flat surface, or a curved surface that extends along the outer peripheral cylindrical raceway surface 11 of the inner ring 1.

Figure 5:
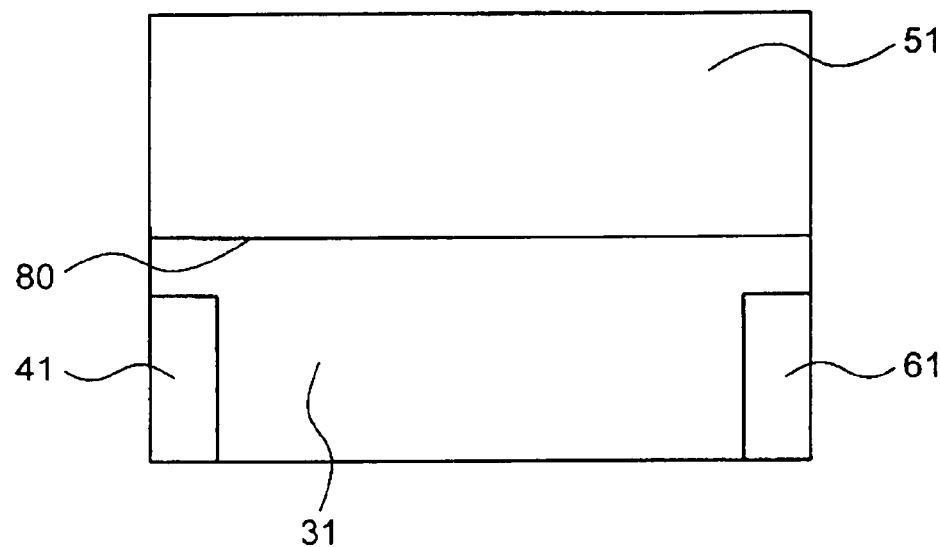
FIG. 5 is a plain view of a first end surface of the separator.

FIG. 5 is a plain view of the first end surface 51 of the separator 7. In the plain view shown in FIG. 5, each of the first groove 41 and the fourth groove 61 has a rectangular planar shape.

The tapered roller bearing having the above-described configuration is installed, for example, as follows. The orientation of each separator 7 is set such that the lubricant is supplied into the first groove 41 and the fourth groove 61 as the cylindrical roller 3 rotates on its axis, and the inner ring 1 is fitted to the outer periphery of the rotating shaft so that the inner ring 1 is secured.

In the cylindrical roller bearing according to the embodiment, the first groove 41 formed in the first concave surface 31 of the separator 7, which serves as the sliding surface on which roller 3 slides, opens toward the outer peripheral cylindrical raceway surface 11 of the inner ring 1 in the radial direction. By appropriately setting the orientation of the separator 7, the lubricant present on, for example, the outer peripheral cylindrical raceway surface 11 is efficiently delivered into the first groove 41 as the cylindrical roller 3 rolls. Because the first groove 41 opens toward the first rib 12 in the axial direction, the lubricant in the first groove 41 is efficiently supplied to the roller guide surface of the first rib 12 through the opening of the first groove 41 that opens toward the first rib 12 in the axial direction. Therefore, it is possible to suppress smearing and seizure of the rolling contact surface of the cylindrical roller 3 and the cylindrical raceway surfaces 11 and 21. In addition, it is possible to suppress seizure of a roller guide surface 88 (see FIG. 1) of the first rib 12.

In the cylindrical roller bearing according to the embodiment, the first groove 41 is present only in the region 81 that is on one side with respect to the position 80. Therefore, the lubricant stored in the first groove 41 is dammed up by the rolling contact surface of the cylindrical roller 3. Thus, the lubricant is less likely to be discharged from the first groove 41 toward the outer ring 2. Accordingly, it is possible to reliably store the lubricant in the first groove 41, thereby improving the lubricating performance.

If the first groove is present on both sides with respect to the position at which the roller contacts the first concave surface and the first concave surface is deepest in its depth direction, the flow of the lubricant is less likely to be prevented by the rolling contact surface of the cylindrical roller. Accordingly, the lubricant stored in the first groove is more likely to be discharged from the first groove toward the outer ring by a centrifugal force of the inner ring.

In the cylindrical roller bearing according to the embodiment, the second end surface 52 of the separator 7, that is, the other end surface of the separator 7 in the circumferential direction of the cylindrical roller bearing, has the second concave surface 32 on which the cylindrical roller 3 slides and the third groove 42 that is contiguous with the second concave surface 32. The third groove 42 opens toward the first rib 12 in the axial direction, and opens toward the outer peripheral cylindrical raceway surface 11 in the radial direction. Accordingly, it is possible to suppress smearing and seizure of the sliding portions that are positioned on opposite sides of the separator 7 in the circumferential direction of the cylindrical roller bearing. Regardless of the orientation of the separator 7, which is set when the roller bearing is installed on the rotating shaft, the lubricant is supplied to one of the first groove 41 and the third groove 42 as the cylindrical roller 3 rotates on its axis. Accordingly, when the cylindrical roller bearing is installed, it is not necessary to take into account the direction in which the separator 7 moves relative to a stationary raceway member. Thus, it is possible to increase the flexibility in installing the cylindrical roller bearing.

In the cylindrical roller bearing according to the embodiment, the first end surface 51 of the separator 7 has the fourth groove 61 that is contiguous with the first concave surface 31. The fourth groove 61 opens toward the second rib 13 in the axial direction, and opens toward the outer peripheral cylindrical raceway surface 11 in the radial direction. Therefore, it is possible to suppress the seizure of the first rib 12 and the seizure of the second rib 13.

In the cylindrical roller bearing according to the embodiment, the grooves 41, 61, 42 and 62 of the separator 7 open in the axial direction of the cylindrical roller bearing. However, the separator of the roller bearing according to the invention may have a groove that does not open in the axial direction of the cylindrical roller bearing.

Figure 6:
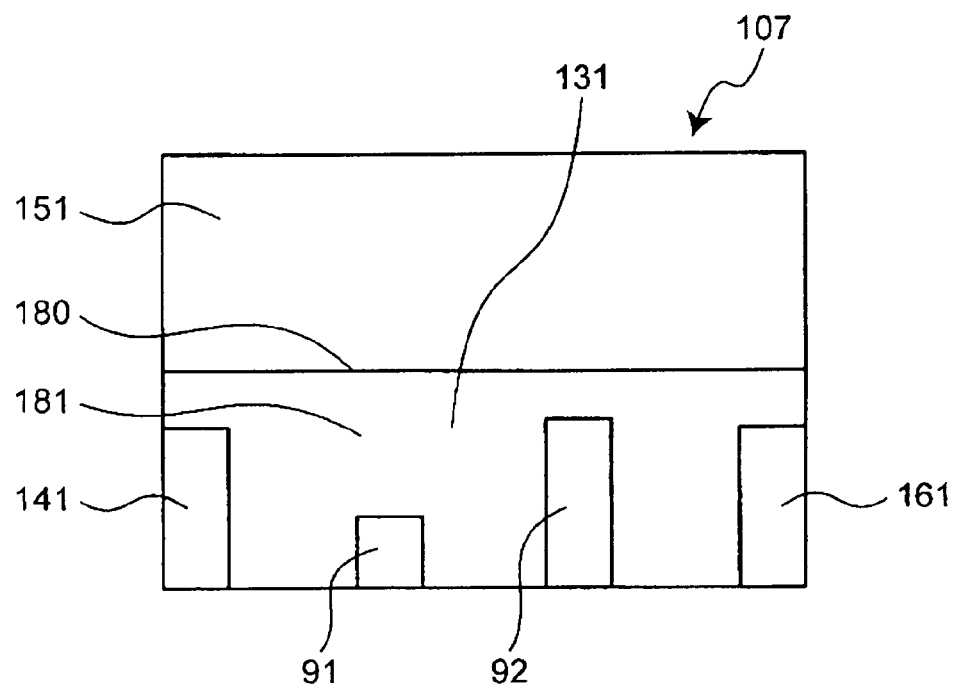
FIG. 6 is a view showing a separator of a cylindrical roller bearing according to a first modified example, and corresponding to FIG. 5.

FIG. 6 is a view showing a separator 107 of a cylindrical roller bearing according to a first modified example, and corresponding to FIG. 5. The first modified example differs from the embodiment described above only in that the separator 107 has second grooves 91 and 92 described below.

In the first modified example, each of a first end surface 151 and a second end surface of the separator 107 has two grooves that do not open in the axial direction of the cylindrical roller bearing, that is, the second grooves 91 and 92. Each of the second grooves 91 and 92 extends in the radial direction of the cylindrical roller bearing, opens toward the outer peripheral cylindrical raceway surface in the radial direction of the cylindrical roller bearing. The second grooves 91 and 92 are present only in a region 181 that is on one side with respect to a position 180 in the radial direction of the cylindrical roller bearing. When the cylindrical roller bearing is used, the region 181 is on the inner side with respect to the position 180 in the radial direction of the cylindrical roller bearing. When each separator 107 is fitted to the cylindrical roller bearing, the cylindrical roller 3 contacts the first concave surface 131 at the position 180. Further, the first concave surface 131 is deepest at the position 180 in its depth direction.

Four grooves present in the first end surface 151, that is, grooves 141 and 161 and the second grooves 91 and 92 differ from each other in length in the radial direction (direction in which these grooves extend).

In the cylindrical roller bearing according to the first modified example, the lubricant stored in the second grooves 91 and 92 is supplied to the sliding portions of the cylindrical roller bearing. Thus, it is possible to further improve the lubricating performance. The length of the first groove 141 differs from the lengths of the second grooves 91 and 91. Further, because the grooves 141, 161, 91 and 92 present in the first end surface 151 differ from each other in length, the effect of supplying the lubricant from the grooves 141, 161, 91 and 92 to the sliding portions is less likely to be influenced by the operation state of the roller bearing.

In the first modified example, the two second grooves 91 and 92 are formed in the first end surface 151. Alternatively, in the invention, at least one of the end surfaces of the separator, on which the cylindrical rollers slide, may have one second groove or three or more second grooves, each of which opens only at one side of the separator in the radial direction and does not open in the axial direction.

In the first modified example, the second grooves that do not open in the axial direction are formed in the first end surface 151. However, as a matter of course, the groove that does not open in the axial direction may be formed in at least one of the first end surface and the second end surface, that is, the end surfaces of the separator in the circumferential direction of the cylindrical roller bearing.

In the cylindrical roller bearing according to the embodiment, the separator 7 does not have any grooves in its end surface in the axial direction (the axial direction of the cylindrical roller bearing). Alternatively, in the invention, the separator may have a groove in its end surface in the axial direction.

Figure 7:
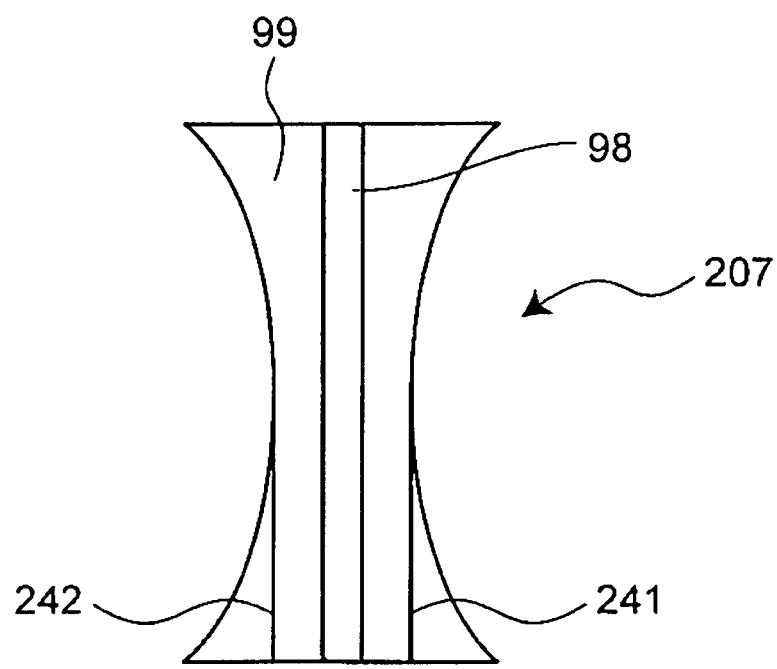
FIG. 7 is a view of one end surface of a separator in the axial direction of a cylindrical roller bearing according to a second modified example, viewed from a position further outward than the end surface in the axial direction.

FIG. 7 is a view of one end surface of a separator in the axial direction of a cylindrical roller bearing according to a second modified example, viewed from a position further outward than the end surface in the axial direction. The second modified example differs from the above-described embodiment in that a separator 207 has a sixth groove 98 described below.

As shown in FIG. 7, the separator 207 of the cylindrical roller bearing according to the second modified example has the sixth groove 98 in an end surface 99 in the axial direction, in addition to a first groove 241 and a third groove 242. The sixth groove 98 extends in the radial direction, and passes through the separator 207 from the inner side end to the outer side end in the radial direction.

In the cylindrical roller bearing according to the second modified example, the end surface 99 of the separator 207 in the axial direction has the sixth groove 98 that passes through the separator 207 in the radial direction. Accordingly, it is possible to store the lubricant in the sixth groove 98, thereby further suppressing seizure of the first rib of the inner ring.

In the cylindrical roller bearing according to the second modified example, the sixth groove 98 that is formed in the end surface of the separator 207 in the axial direction passes through the separator 207 in the radial direction, and open at both ends in the radial direction. Alternatively, in the invention, the groove in the end surface of the separator in the axial direction may be formed so as to open at only one end in the radial direction, or so as not to open at either end in the radial direction. In the invention, as a matter of course, a groove may be formed in at least one of the end surfaces of the separator 207 in the axial direction.

According to the invention, each groove formed in the first end surface or the second end surface of the separator in the circumferential direction may be present only in the region that is on one side with respect to the given position in the radial direction. The cylindrical roller contacts the concave surface, on which the cylindrical roller slides, at the given position. Further, the concave surface is deepest at the given position in its depth direction. Alternatively, each groove formed in the first end surface or the second end surface of the separator in the circumferential direction may lie astride the regions on both sides with respect to the given position.

In the cylindrical roller bearings according to the embodiment and the modified examples of the embodiment, each of the grooves 41, 42, 61 and 62 of the separator 7, the grooves 141, 161, 91, 92 of the separator 107, and the grooves 241, 242 and 99 of the separator 207 extends in the radial direction, and has a rectangular planar shape. However, in the invention, the planar shape of each groove of the separator need not be rectangular, and may be in any shapes other than a rectangular shape, such as a trapezoidal shape, a parallelogram, and a corrugated shape.

In the cylindrical roller bearings according to the embodiment and the modified examples of the embodiment, each of the grooves 41, 42, 61 and 62 of the separator 7, the grooves 141, 161, 91, 92 of the separator 107, and the grooves 241, 242 and 99 of the separator 207 extends in the radial direction. Alternatively, in the invention, each groove may extend in a direction that is inclined with respect to the radial direction. Each groove may extend linearly, or may extend non-linearly, for example, extend in a meandering fashion.

In the cylindrical roller bearing according to the embodiment, the inner ring 1 has the ribs 12 and 13 positioned at the opposite sides of the outer peripheral cylindrical raceway surface 11 in the axial direction, but the outer ring 2 does not have any ribs. However, the cylindrical roller bearing in the invention may be configured such that the inner ring does not have any ribs but the outer ring has ribs positioned at the opposite sides of the inner peripheral cylindrical raceway surface in the axial direction. In this case, it is needless to say that each of the separators 7, 107 and 207 described above may be reversed in the up-down direction when used. When at least one of the inner end surface and the outer end surface of the above-described separator in the radial direction has a shape that extends along the raceway surface of the raceway member, it is needless to say that not only the separator needs to be reversed in the up-down direction but also the shape of at least one of the inner end surface and the outer end surface of the separator in the radial direction needs to be changed.

In the cylindrical roller bearing according to the embodiment, the inner ring 1 has the ribs 12 and 13 that are positioned at the opposite sides of the outer peripheral cylindrical raceway surface 11 in the axial direction but the outer ring 2 does not have any ribs. Alternatively, in the invention, the inner ring may have only one rib that is positioned at one side of the outer peripheral cylindrical raceway surface in the axial direction, and the outer ring may have only one rib that is positioned at the other side of the inner peripheral cylindrical raceway surface in the axial direction. In this case as well, grooves that open toward the ribs in the axial direction and open toward the cylindrical raceway surfaces in the radial direction are formed in each separator. Preferably, the grooves that open toward one of the rib of the inner ring and the rib of the outer ring in the axial direction are formed so as to open toward the outer peripheral raceway surface of the inner ring in the radial direction, and the grooves that open toward the other of the rib of the inner ring and the rib of the outer ring in the axial direction are formed so as to open toward the inner peripheral raceway surface of the outer ring in the radial direction.

In the cylindrical roller bearing according to the embodiment, the grooves 41 and 61 of the first end surface 51, which is one end surface of the separator 7 in the circumferential direction, and the grooves 42 and 62 of the second end surface 52, which is the other end surface of the separator 7 in the circumferential direction, open toward the inner ring in the radial direction. Alternatively, in the invention, the grooves in the first end surface, which is one end surface of the separator in the circumferential direction, and the grooves of the second end surface, which is the other end surface of the separator in the circumferential direction, may open toward the outer ring in the radial direction. Further alternatively, in the invention, the grooves in one of the first end surface, which is one end surface of the separator in the circumferential direction, and the second end surface, which is the other end surface of the separator in the circumferential direction, may open toward the inner ring in the radial direction, and the grooves in the other of the first end surface and the second end surface may open toward the outer ring in the radial direction.

It is needless to say that a modified example that includes the first groove 41 and at least one of the second to sixth grooves 42, 61, 62, 91, 92 and 98 is within the scope of the invention. Further, it is needless to say that a modified example that includes only the first groove 41 is within the scope of the invention.

In the cylindrical roller bearing according to the embodiment, the raceway members 1 and 2 are annular members. Alternatively, in the invention, the raceway members may include a shaft member, and the raceway surface may be formed in the outer peripheral surface of the shaft member.

In the roller bearing according to the invention, one raceway member (the first raceway member or the second raceway member) that is positioned further inward than the other raceway member in the radial direction may be either a rotational raceway member or a stationary raceway member.

In each of the embodiment and the modified examples of the embodiment, the roller is a cylindrical roller. Alternatively, in the invention, a roller other than a cylindrical roller, for example, a tapered roller or a convex roller may be used. It is a well known fact that, when a tapered roller is used, seizure is likely to occur at a roller guide surface of a rib that is positioned next to a tapered raceway surface of an inner ring and at a large diameter-side end of the inner ring and that receives an axial load. Accordingly, by forming the above-described various grooves including the first groove that open in the axial direction in a separator of the taper roller bearing, it is possible to effectively suppress seizure of the roller guide surface.

What is claimed is:

1. A roller bearing, comprising:
a first raceway member that has a first raceway surface and a first rib that is positioned at one side of the first raceway surface in an axial direction of the roller bearing;
a second raceway member that has a second raceway surface;
a plurality of rollers arranged between the first raceway surface and the second raceway surface; and
a plurality of separators which are arranged between the first raceway surface and the second raceway surface, wherein each separator is interposed between two circumferentially adjacent rollers of the plurality of rollers,
wherein a first circumferential end surface of the separator has a first concave surface on which the roller slides, and a first groove that is contiguous with the first concave surface,
the first groove opens toward the first rib in the axial direction and opens toward the first raceway surface in a radial direction of the roller bearing,
the first groove does not radially extend to a location on the separator, the location on the separator being the location where the roller contacts the first concave surface and the first concave surface is deepest in a depth direction of the first concave surface,
the first circumferential end surface of the separator has a second groove that opens toward the first raceway member in the radial direction,
the first groove and the second groove are recessed in the first concave surface, the first groove and the second groove extend in the radial direction of the roller bearing,
a length of the first groove differs from a length of the second groove in the radial direction of the roller bearing, and
the first groove and the second groove are present only on one radial side of the location on the separator and open toward the first raceway surface in the radial direction.

2. The roller bearing according to claim 1,
wherein a second circumferential end surface of the separator has a second concave surface on which the roller slides and a third groove that is contiguous with the second concave surface; and
the third groove opens toward the first rib in the axial direction and opens toward the first raceway surface in the radial direction.

3. The roller bearing according to claim 1,
wherein the first raceway member has a second rib that is positioned at the other side of the first raceway surface in the axial direction;
the first circumferential end surface of the separator has a third groove that is contiguous with the first concave surface; and
the third groove opens toward the second rib in the axial direction and opens toward the first raceway surface in the radial direction.

4. The roller bearing according to claim 2,
wherein the first raceway member has a second rib that is positioned at the other side of the first raceway surface in the axial direction;
the first circumferential end surface of the separator has a fourth groove that is contiguous with the first concave surface; and
the fourth groove opens toward the second rib in the axial direction and opens toward the first raceway surface in the radial direction.

* * * * *